(12) United States Patent
Zhang et al.

(10) Patent No.: US 12,243,980 B2
(45) Date of Patent: Mar. 4, 2025

(54) MULTI-LAYER ELECTROLYTE ASSEMBLY FOR LITHIUM BATTERIES

(71) Applicant: WESTFÄLISCHE WILHELMS-UNIVERSITÄT MÜNSTER, Münster (DE)

(72) Inventors: Mengyi Zhang, Münster (DE); Peter Bieker, Hamm (DE); Lei Gui, Münster (DE); Martin Winter, Münster (DE)

(73) Assignee: WESTFÄLISCHE WILHELMS-UNIVERSITÄT MÜNSTER (DE)

( * ) Notice: Subject to any disclaimer, the term of this patent is extended or adjusted under 35 U.S.C. 154(b) by 651 days.

(21) Appl. No.: 17/440,531

(22) PCT Filed: Mar. 18, 2020

(86) PCT No.: PCT/EP2020/057418
§ 371 (c)(1),
(2) Date: Sep. 17, 2021

(87) PCT Pub. No.: WO2020/187976
PCT Pub. Date: Sep. 24, 2020

(65) Prior Publication Data
US 2022/0158237 A1    May 19, 2022

(30) Foreign Application Priority Data
Mar. 19, 2019  (DE) .................. 102019107017.1

(51) Int. Cl.
*H01M 10/0565* (2010.01)
*H01G 11/56* (2013.01)
(Continued)

(52) U.S. Cl.
CPC ........ *H01M 10/0565* (2013.01); *H01G 11/56* (2013.01); *H01M 10/052* (2013.01);
(Continued)

(58) Field of Classification Search
None
See application file for complete search history.

(56) References Cited

U.S. PATENT DOCUMENTS

2009/0111025 A1    4/2009  Lee et al.
2010/0003604 A1*   1/2010  Kang .............. C07F 9/091
                                                    429/314
(Continued)

FOREIGN PATENT DOCUMENTS

DE    10 2010 030 197 A1    12/2011
DE    10 2011 120 959 A1    8/2012
(Continued)

OTHER PUBLICATIONS

James Evans, et al., "Electrochemical measurement of transference numbers in polymer electrolytes", Polymer, vol. 28, pp. 2324-2328 Dec. 1987.
(Continued)

*Primary Examiner* — Scott J. Chmielecki
(74) *Attorney, Agent, or Firm* — Davidson Kappel LLC (57) ABSTRACT

The invention relates to an electrolyte arrangement for a cell having at least one anode (1) and at least one cathode (3) comprising at least three superposed layers (2.1, 2.2, 2.3), wherein the middle layer (2.2) comprises a porous electrically nonconductive structure, and wherein a layer of a polymer-based electrolyte (2.1, 2.3) is arranged on both opposite sides of the porous electrically nonconductive structure, wherein at least one of the superposed layers (2.1, 2.2, 2.3) contains a ceramic material, wherein the ceramic material of the middle layer (2.2) is selected from metal ion-conductive ceramic material, a ceramic material which does not conduct metal ions, and/or mixtures thereof, and the ceramic material of the polymer-based electrolyte layer(s) (2.1, 2.3) is a metal ion-conductive ceramic material.

15 Claims, 8 Drawing Sheets

(51) Int. Cl.
  *H01M 10/052* (2010.01)
  *H01M 12/08* (2006.01)
  *H01M 50/414* (2021.01)
  *H01M 50/417* (2021.01)
  *H01M 50/434* (2021.01)
  *H01M 50/451* (2021.01)
  *H01M 50/457* (2021.01)
  *H01M 50/489* (2021.01)

(52) U.S. Cl.
  CPC ......... *H01M 12/08* (2013.01); *H01M 50/414* (2021.01); *H01M 50/417* (2021.01); *H01M 50/434* (2021.01); *H01M 50/451* (2021.01); *H01M 50/457* (2021.01); *H01M 50/489* (2021.01); *H01M 2300/0051* (2013.01); *H01M 2300/0094* (2013.01)

(56) References Cited

U.S. PATENT DOCUMENTS

| | | | |
|---|---|---|---|
| 2011/0027658 A1* | 2/2011 | Kim | H01M 50/434 |
| | | | 427/508 |
| 2013/0266842 A1 | 10/2013 | Woehrle et al. | |
| 2014/0045033 A1* | 2/2014 | Zhang | H01M 50/451 |
| | | | 429/145 |
| 2016/0056437 A1 | 2/2016 | Huang et al. | |
| 2018/0330844 A1* | 11/2018 | Aetukuri | H01B 1/20 |

FOREIGN PATENT DOCUMENTS

| | | |
|---|---|---|
| DE | 10 2012 107 848 A1 | 5/2014 |
| DE | 10 2015 111 806 A1 | 1/2017 |
| WO | WO 2016/077663 A1 | 5/2016 |

OTHER PUBLICATIONS

International Search Report and Written Opinion mailed Jun. 30, 2020 from corresponding International Application No. PCT/EP2020/057418 (in German).

German Search Report mailed on Jan. 31, 2020 from corresponding German Application No. 10 2019 107 017.1 (in German).

* cited by examiner

MULTI-LAYER ELECTROLYTE ASSEMBLY FOR LITHIUM BATTERIES

This application is a U.S. national phase application under 35 U.S.C. § 371 of International Application No. PCT/EP2020/057418, filed Mar. 18, 2020, which claims priority of German Patent Application No. DE 10 2019 107 017.1, filed Mar. 19, 2019, the disclosures of which are hereby incorporated by reference herein.

The invention relates to a polymer-based electrolyte for an electrochemical cell and to energy stores containing the latter, especially those having an anode made from lithium metal or lithium alloys.

The technology of lithium-ion batteries is prominent in the field of portable electronics; however, applications in electric vehicles require the development of batteries having much higher specific energies. In current lithium-ion batteries, the energy density is limited inter alia by the use of graphite anodes. In contrast, lithium is a promising electrode material due to a low redox potential, its high capacity and low molecular weight, and lithium-air batteries offer the advantage of substantially higher specific capacity and energy compared to conventional lithium-ion batteries.

While conventional lithium-ion batteries contain a liquid electrolyte, usually a lithium salt dissolved in an organic carbonate, in solid-state accumulators, also called solid-state batteries, both the electrodes and the electrolyte are formed from a non-liquid, solid material. In lithium-ion batteries, the charge transport takes place between the positive and negative electrode via the liquid electrolyte, a short circuit being prevented by a separator arranged between the electrodes. In solid-state accumulators, in which the electrolyte is a solid polymer electrolyte or a glass-ceramic material, the flow of ions occurs via the movement of the ions of the conductive salt through the polymer or the glass-ceramic. The solid electrolyte also serves as a separator here.

However, the use of lithium anodes has to date been made difficult due to the reactive nature of the lithium metal, a low cycling stability and safety concerns resulting from the growth of dendrites on the electrode. The lithium dendrites growing over the course of the cycle duration can penetrate through the separator, triggering short circuits. In order to prevent dendrite growth, various solutions have been proposed such as modifications of the surface of the lithium metal or of the separator, or modifications of the polymer electrolyte or solid-state electrolyte.

For example, DE 10 2012 107 848 A1 describes a multilayer separator comprising at least two superposed individual layers, wherein a structure with a plurality of continuous pores for receiving an electrolyte runs through at least one individual layer. A separator-anode composite can include a three-layer separator, wherein the second individual layer is also formed from a porous material, wherein the first individual layer is a polyolefin separator, the second individual layer is a polypropylene mesh and the third layer a polypropylene mesh the cavity volume of which has been completely filled with lithium metal. The anode material here is for example rolled. However, this composite arrangement is not suitable for preventing the growth of dendrites through the separator.

US 2016/0056437 A1 describes an anode with an integrated two-layer separator for a lithium-ion battery, wherein the two-layer separator comprises a porous layer of separator particles and a pore-containing polymer layer. The separator is impregnated with a liquid electrolyte for the transport of lithium ions. The rigid ceramic layer serves to suppress the growth of dendrites through the separator. However, the bonding of the ceramic separator layer to the anode has to be established by means of an additional thin polymer layer.

WO 2016/077663 A1 describes a composite separator and electrolyte. This comprises at least one electrolyte film in contact with a porous, self-supporting separator film, wherein the electrolyte film can contain a lithium salt and a polymeric complexing agent such as PEO. The separator can be used either dry or immersed in a liquid electrolyte composition. The porous, self-supporting separator film can have an electrolyte film on both sides. The arrangement is very flexible, however penetration of the composite separator by lithium dendrites cannot be prevented. In addition, it is not disclosed whether cells containing the composite separator and electrolyte are rechargeable.

One object of the invention was therefore that of providing an electrolyte arrangement having improved performance and safety.

This object is achieved by an electrolyte arrangement for an (in particular electrochemical) cell, having at least one anode and at least one cathode, comprising at least three superposed layers, wherein the middle layer comprises a porous electrically nonconductive structure, and wherein a layer of a polymer-based electrolyte is arranged on both opposite sides of the porous electrically nonconductive structure, wherein at least one of the superposed layers contains a ceramic material, wherein the ceramic material of the middle layer is selected from metal ion-conductive ceramic material, a ceramic material which does not conduct metal ions, and/or mixtures thereof, and the ceramic material of the polymer-based electrolyte layer(s) is a metal ion-conductive ceramic material.

It has surprisingly been found that the electrolyte arrangement according to the invention can provide a reduction in the interfacial resistance between the electrolyte and electrode, an improved thermal stability and also an increased cycling stability. Without being tied to a particular theory, it is assumed that the ceramic material can prevent shrinkage of the electrolyte while the binding to the electrodes is simultaneously improved. This makes it possible to considerably increase the safety as well as the cyclic lifetime of a cell. In particular, the electrolyte arrangement can prevent lithium dendrites, which form during the cycling of a lithium battery, from penetrating the electrolyte, which in a solid-state cell also functions as a separator, and causing a short circuit. In particular, it was possible to show that the electrolyte arrangement was stable with high-voltage cathode materials and high cell voltages of up to 4.85 V.

The electrolyte arrangement comprises at least three superposed layers. The middle layer here comprises a porous, electrically nonconductive structure. The pores of the porous structure can receive a polymer electrolyte. Such a structure can be formed by a porous electrically nonconductive membrane, for example a ceramic or polymeric separator. One advantage of the porous electrically nonconductive membrane is that the mechanical properties of the electrolyte arrangement are improved. As a result of this, the layer thickness of the individual electrolyte layers and hence the total thickness of the electrolyte arrangement can be controlled. This also enables a simple process for producing the arrangement since the polymer electrolytes can be applied to a mechanically stable central layer.

At least one of the superposed layers of the electrolyte arrangement contains a ceramic material. The ceramic material promotes the stability of the arrangement. Advantageously, this can markedly reduce what is known as thermal shrinkage of the electrolyte arrangement in the event of a temperature increase during operation of a cell.

The ceramic material can in this case be present in the middle layer or in at least one of the polymer-based electrolyte layers. In embodiments in which the ceramic material is present in the middle layer, said material can be selected from a metal ion-conductive ceramic material, a ceramic material which does not conduct metal ions, and/or mixtures thereof. The metal ion-conductive ceramic material is in particular a lithium ion-conductive ceramic material. In embodiments in which the ceramic material is present in at least one of the polymer-based electrolyte layers, the ceramic material is a metal ion-conductive, in particular a lithium ion-conductive, ceramic material.

The porous, electrically nonconductive structure of the middle layer can be formed from a ceramic or a polymeric material. In embodiments, the middle layer can contain a ceramic membrane such as an $Al_2O_3$ membrane, which is surrounded on both opposite sides by a polymer electrolyte without ceramic material, or at least one of the polymer-based electrolyte layers can contain a lithium ion-conductive ceramic material. In other embodiments, the middle layer can contain a polymeric membrane, for example a polypropylene membrane, wherein in these embodiments at least one of the polymer-based electrolyte layers contains a lithium ion-conductive ceramic material. In a preferred embodiment of the electrolyte arrangement, a layer of a polymer-based electrolyte is arranged on both opposite sides of a ceramic-free middle layer, wherein at least one of the polymer-based electrolyte layers contains a lithium ion-conductive ceramic material.

In the context of the present invention, the term "membrane" is to be understood in general to mean a thin layer. A "porous" membrane is understood to mean a membrane having a pore structure. The porosity represents the ratio of cavity volume to total volume of the membrane. The porosity or the cavity content is preferably in the range from ≥30% by volume to ≤60% by volume, based on the total volume of the membrane. Microporous membranes are preferred. The pore size can be in the range from ≥0.02 µm to ≤2 µm. An "electrically nonconductive" membrane is understood to mean that the electrical conductivity at 20° C. is less than $10^{-7}$ S cm$^{-1}$, meaning that an electrical separation of the electrodes is achieved and a short circuit is avoided. The membrane can be formed from a polymeric or a ceramic material or a composite material of polymer and ceramic. Examples of suitable polymers are those selected from the group comprising polyolefins such as polypropylene or polyethylene, poly(vinylidene difluoride-co-hexafluoropropylene) (PVdF-HFP), polyethylene terephthalate (PET), polyvinylidene fluoride (PVdF), polyimide (PI), carboxymethyl cellulose (CMC) and/or polytetrafluoroethylene (PTFE) and/or mixtures and copolymers thereof. The ceramic material of the middle layer can be selected from metal ion-conductive ceramic material, a ceramic material which does not conduct metal ions, and/or mixtures thereof. A metal ion-conductive ceramic material is in particular a lithium ion-conductive glass-ceramic material. A ceramic material which does not conduct metal ions can be selected from $Al_2O_3$, $SiO_2$ and/or mixtures thereof. Polypropylene, polyethylene and combined polypropylene-polyethylene membranes are obtainable from Celgard LLC, for example Celgard® 2500. Ceramic $Al_2O_3$ membranes are obtainable for example under the name Separion®. Polymer nonwovens are also usable as porous, electrically nonconductive membrane.

Typically, a dispersion of the polymer is applied to the membrane and dried. It is assumed that the electrolyte dispersion can penetrate into the pores of the porous membrane during the drying process. It is preferable for the pore diameter of the porous membrane to be smaller than the particle diameter of the ceramic particles in the electrolyte dispersion so that, when using a polymer-based electrolyte containing particles of a ceramic material, preferably only the proportion of polymer electrolyte comprising polymer, metal salt and optionally plasticizer and/or crosslinker and solvent penetrates into the pores of the porous membrane. In embodiments of the electrolyte arrangement, in the range from ≤50% by volume to ≥100% by volume, with preference in the range from ≥70% by volume to ≤100% by volume, preferably in the range from ≥80% by volume to ≤100% by volume, of the pore volume of the porous electrically nonconductive structure or membrane is filled with a polymer-based electrolyte, in particular a polymer electrolyte without glass-ceramic material. It is preferable for at least 50% of the pore volume of the membrane to be filled with polymer electrolyte, so that a sufficient conductivity is guaranteed across the middle layer of the electrolyte arrangement. The remaining volume can be filled with air. A very good filling is achievable with 97% or 98% of the pore volume.

The thickness of the porous, electrically nonconductive membrane can be in the range from ≥5 µm to ≤50 µm. In embodiments, the total thickness of the electrolyte arrangement is in the range from ≥5 µm to ≤300 µm, with preference in the range from ≥10 µm to ≤200 µm, preferably in the range from ≥15 µm to ≤100 µm. For use in lithium high-energy batteries it is advantageous when the electrolyte/separator has a minimal thickness. In particular, a thickness of less than 200 µm or 100 µm allows good bendability of the electrolyte arrangement. The layer thickness of the polymer electrolyte layer without lithium ion-conducting ceramic can be less than the layer thickness of the polymer-based electrolyte layer which contains a ceramic material, and can be in the range from ≥0.01 µm to ≤20 µm. The layer thickness of the polymer-based electrolyte layer which contains a glass-ceramic material can be in the range from ≥0.1 µm to ≤50 µm.

The terms "polymer electrolyte" and "polymeric electrolytes" are understood to mean solutions of salts in polymers such as polyethylene oxide (PEO). The salts such as lithium salts provide the charge transport via movement of the lithium ions through the layer. The use of polymeric electrolytes in rechargeable lithium batteries generally enables an improvement in terms of the safety aspect, and also a simplification of cell manufacture. Besides PEO, many other polymers such as polyacrylonitrile, polymethyl methacrylate, polyvinyl chloride or polyvinylidene fluoride have been described in the literature as a polymer matrix for gel electrolytes. Polymer-based electrolyte layers can be produced by the casting of films. Alternatively, polymer electrolyte layers can be produced by crosslinking polymerization of suitable monomers in the presence of plasticizer and conductive salt. The term "polymer-based electrolyte" in the context of the present invention refers to a polymer electrolyte which can in addition contain a ceramic material.

In embodiments, the polymer-based electrolyte layer(s) comprise a polymer selected from the group comprising polyethylene oxide (PEO), polyethylene glycol, polypropylene carbonate (PPC), polyethylene carbonate (PEC), poly(bis((methoxyethoxy)ethoxy)phosphazene) (MEEP), polypropylene oxide (PPO), polysiloxane having an average molecular weight of from 300 g/mol to 10 000 g/mol, polyolefins, in particular polypropylene or polyethylene, poly(vinylidene difluoride-co-hexafluoropropylene) (PVdF-HFP), polyethylene terephthalate (PET), polyvinylidene fluoride (PVdF), polyimide (PI), carboxymethyl cellulose (CMC) and/or polytetrafluoroethylene (PTFE) and/or mixtures and copolymers thereof. Mixtures and copolymers can have different ratios of proportions depending on the polymers used. Preference is for example given to mixtures comprising polyethylene oxide (PEO) and polypropylene carbonate (PPC). A preferred polymer is polyethylene oxide (PEO). PEO can dissolve lithium salts well.

The polymer-based electrolyte further includes at least one metal salt or conductive salt. The metal salt is preferably an organic or inorganic salt of lithium, sodium, magnesium, aluminium or zinc. Lithium salts are preferred. Suitable in principle are lithium salts which can dissolve in a polymer dispersion. Suitable lithium salts are for example selected from the group comprising $LiAsF_6$, $LiClO_4$, $LiSbF_6$, $LiPtCl_6$, $LiAlCl_4$, $LiGaCl_4$, LiSCN, $LiAlO_4$, $LiCF_3CF_2SO_3$, $Li(CF_3)SO_3$ (LiTf), $LiC(SO_2CF_3)_3$, $LiPF_6$, $LiPF_3(CF_3)_3$ (LiFAP) and $LiPF_4(C_2O_4)$ (LiTFOB), $LiBF_4$, lithium bis(oxalato)borate ($LiB(C_2O_4)_2$, LiBOB), $LiBF_2(C_2O_4)$ (LiDFOB), $LiB(C_2O_4)(C_3O_4)$ (LiMOB), $Li(C_2F_5BF_3)$ (LiFAB) and $Li_2B_{12}F_{12}$ (LiDFB) and/or lithium salts of sulfonylimides, preferably lithium bis(fluorosulfonyl)imide (LiN($FSO_2$)$_2$, LiFSI), lithium bis(trifluoromethanesulfonyl)imide (LiN($SO_2CF_3$)$_2$, LiTFSI) and/or LiN($SO_2C_2F_5$)$_2$ (LiBETI). Preference is given to those lithium salts which do not decompose at elevated temperatures of for example 100° C. or 120° C. In embodiments, the lithium salt is selected from the group comprising lithium bis(trifluoromethanesulfonyl) imide (LiTFSI), lithium bis(fluorosulfonyl)imide (LiFSI), $LiClO_4$, $LiBF_4$, $LiPF_6$ and lithium bis(oxalato)borate.

In embodiments, the polymer-based electrolyte(s) comprises or comprise at least one polymer and metal salt and optionally plasticizer and/or crosslinker. The polymer-based electrolyte(s) contain at least polymer and metal salt, in particular a lithium salt. Plasticizers and/or crosslinkers may also be present. Plasticizers and crosslinkers can reduce the crystallization of the polymers. Preferred plasticizers are organic solvents and ionic liquids. Suitable organic solvents are for example selected from the group comprising ethylene carbonate (EC), propylene carbonate (PC), diethyl carbonate (DEC), chloroform, and/or dimethyl carbonate (DMC). These solvents have proven to be particularly suitable for the production of the polymer layers. Suitable ionic liquids are preferably selected from the group of the N-alkyl-N-methylpyrrolidinium bis(trifluoromethanesulfonyl)imides ($PYR_{1A}$TFSI, where $A=C_nH_{2n+1}$, n being an integer from 1 to 10). A preferred crosslinker is for example benzophenone.

Benzophenone has proven to be particularly suitable for improving the mechanical stability of the electrolyte layers.

In embodiments, the polymer-based electrolyte(s) comprises or comprise a polymer, a lithium salt and optionally plasticizer and/or crosslinker, wherein the molar ratio of polymer to lithium salt to plasticizer and to crosslinker is in the range from $\geq 0.5$ to $\leq 20$:1:$\geq 0$ to $\leq 10$:$\geq 0$ to $\leq 1$. In particular, the molar ratio of polymer to lithium salt to plasticizer and to crosslinker can be 10:1:2:0.121. The term "molar ratio" in the context of the present invention is understood to mean the ratio of the molar amount of one component to the molar amount of the other component. The molar ratio is based here on the starting substances used to produce the polymer layer. The lithium salt is in this case set to 1 as reference. The polymer, for example polyethylene oxide, is calculated for the molar ratio on the basis of the monomer/repeating units. Electrolyte layers which have been produced in accordance with this molar ratio exhibit in particular good mechanical stability and ion transport properties.

One or both polymer-based electrolyte layers on the opposite sides of the porous, electrically non-conducting membrane can contain a ceramic material. Advantageously, a layer containing lithium ion-conducting ceramic promotes the stability of the arrangement, so that it does not shrink or at least shrinks to a much lower extent. Advantageously, the ceramic present can further prevent lithium dendrites from penetrating through the electrolyte layer and leading to a short circuit. The lithium ion-conducting ceramic is preferably in the form of small particles in the layer, as a result of which sufficient flexibility of the layer can further be provided.

Preferred lithium ion-conducting ceramics are glass-ceramics comprising lithium compounds which have a structure similar to NASICON (sodium (Na) super ionic conductor) or a garnet-like structure of the crystal phase. In the context of the present invention, the term "glass-ceramic material" is understood to mean a material which starting from a starting glass produced by melt technology is converted by temperature treatment into a glass-ceramic comprising a glass phase and a crystal phase. The glass-ceramic can be produced by ceramicization from a starting glass or by ceramicization and sintering and/or pressing of starting glass powder. Such a glass-ceramic exhibits conductivity for metal ions and especially for lithium ions. Corresponding glass-ceramics are known to those skilled in the art and are commercially available. In embodiments, the lithium ion-conducting glass-ceramic comprises a lithium ion-conducting crystal phase which is a NASICON-like phosphate glass-ceramic of the empirical formula $Li_{1+x}(Al, Ge)_x(PO_4)_3$, where $0 \leq x < 1$ and $(1+x) > 1$, a lithium compound having a garnet-like structure such as LLZO with various dopants or solid lithium sulfides such as $Li_{10}GeP_2S_{12}$. A preferred NASICON-like phosphate glass-ceramic is for example lithium aluminium germanium phosphate (LAGP). Lithium lanthanum zirconate (LLZO), $Li_7La_3Zr_2O_{12}$, with or without doping with aluminium, niobium and/or tantalum oxide, have also proven to be particularly suitable. The lithium ion conductivity of such glass-ceramics can be in a range from $\geq 10^{-4}$ S/cm to $\leq 10^{-2}$ S/cm at 20° C.

In embodiments, the proportion of ceramic material in the polymer-based electrolyte layer is in the range from $\geq 5\%$ by weight to $\leq 80\%$ by weight, preferably in the range from $\geq 35\%$ by weight to $\leq 65\%$ by weight, based on a total weight of the polymer-based electrolyte layer of 100% by weight. When using such proportions of lithium ion-conducting ceramic, the electrolyte arrangements exhibit a good mechanical stability and a good lithium ion conductivity.

The further components of a polymer-based electrolyte layer which contains a lithium ion-conducting ceramic may be identical or different with respect to the further polymer-based electrolyte layer. It is preferable for the components of the polymer-based electrolyte layers such as polymer, metal salt and optionally plasticizer and/or crosslinker to be identical, possibly with the exception of the ceramic. This makes it possible to provide a good composite and uniform ion conduction across the entire arrangement. Furthermore, an electrolyte layer which contains a lithium ion-conducting ceramic can easily be produced by dispersing the ceramic in the electrolyte composition which is used for the other side.

A polymer-based electrolyte layer which contains a lithium ion-conducting ceramic preferably comprises:
a polymer selected from the group comprising PEO, polyethylene glycol, PPC, PEC, MEEP, PPO, polysiloxane having an average molecular weight of from 300 g/mol to 10 000 g/mol, polyolefins, in particular polypropylene or polyethylene, PVdF-HFP, polyimide, PET, PVdF, CMC and/or PTFE and/or mixtures and copolymers thereof; and/or at least one metal salt, preferably an organic or inorganic salt of lithium, sodium, magnesium, or zinc; and optionally plasticizer and/or crosslinker, as described above for the polymer-based electrolyte layer(s).

It may be preferable for the polymer-based electrolyte layer containing a ceramic material to include a polymer selected from the group comprising polyolefins, in particular polypropylene or polyethylene, poly(vinylidene difluoride-co-hexafluoropropylene) (PVdF-HFP), polyimide (PI), polyethylene terephthalate (PET), polyvinylidene fluoride (PVdF), carboxymethyl cellulose (CMC) and/or polytetrafluoroethylene (PTFE).

The electrolyte arrangement can be a multilayer electrolyte arrangement. The electrolyte arrangement is preferably in the form of a three-layer arrangement, at least one of the superposed layers containing a ceramic material. Preferably, at least one of the two outer polymer-based electrolyte layers contains a lithium ion-conducting ceramic material. The lithium ion-conducting ceramic-containing layer may be arranged on the cathode or contact the latter. The lithium ion-conducting ceramic can reduce the interfacial resistance between the electrolyte and a cathode, prevent thermal shrinkage and/or enlarge the electrochemical stability window. In embodiments in which the lithium ion-conducting ceramic is not compatible with lithium metal, it is preferable for direct contact between the lithium ion-conducting ceramic and the anode to be avoided.

It may be provided that a ceramic-free polymer-based electrolyte layer in a cell or an electrochemical energy store is arranged on the anode, in particular a lithium metal anode, and/or contacts the anode. Advantageously, the ceramic-free polymer-based electrolyte layer is stable with respect to lithium metal and can establish good adhesion in particular with respect to a lithium metal electrode. In other embodiments, ceramic material-containing layer can be arranged on the anode or contact said anode. For example, an LLTO-containing layer arranged on an anode can increase cycling stability.

It can be provided in other embodiments that both layers contain lithium ion-containing ceramic. In embodiments, the electrolyte arrangement can be in the form of a four- or multilayer arrangement. In this case for example, a further polymer-based electrolyte layer which preferably contains another lithium ion-conducting ceramic can be arranged on the lithium ion-conducting ceramic-containing layer. For example, a fourth layer containing a lithium aluminium germanium phosphate glass-ceramic (LAGP) can be applied. This preferably contacts the cathode in a cell. In other embodiments, a further ceramic-free polymer-based electrolyte layer can be applied to the lithium ion-conducting ceramic-containing layer.

A further subject of the invention relates to an electrolyte-electrode composite, comprising an anode, a cathode and an electrolyte arrangement according to the invention arranged between the anode and cathode. Reference is made to the above description for the description of the electrolyte arrangement.

In embodiments of the electrolyte-electrode composite, the polymer-based electrolyte layer containing a ceramic material can contact the anode or the cathode. In preferred embodiments, an electrolyte-electrode composite comprises a lithium metal anode or an anode made from a lithium alloy. In embodiments, the polymer-based electrolyte layer containing a ceramic material contacts the cathode, while the ceramic-free polymer-based electrolyte layer in particular contacts a lithium metal anode. In other embodiments, a ceramic material-containing layer can be arranged on the anode or contact said anode.

A further subject of the invention relates to a primary or secondary, in particular electrochemical energy store, comprising an electrolyte arrangement according to the invention. In the context of the present invention, the term "energy store" encompasses primary and secondary electrochemical energy storage devices, that is to say batteries (primary stores) and accumulators (secondary stores). In general linguistic use, accumulators are frequently referred to with the term "battery" commonly used as an umbrella term. For instance the term lithium-air battery is used synonymously to lithium-air accumulator. In this respect, the term "lithium-air battery" can in the present case also refer to a "lithium-air accumulator". The term "electrochemical energy store" in the context of the present invention also in particular encompasses electrochemical capacitors such as supercapacitors. Electrochemical capacitors, also referred to as supercapacitors in the literature, are electrochemical energy stores which compared to batteries feature a higher power density and compared to conventional capacitors feature a higher energy density.

The electrochemical energy store comprises at least one cell having a positive electrode and a negative electrode and an electrolyte arrangement according to the invention which is arranged between the electrodes.

The electrochemical energy store is preferably a lithium metal battery, a solid-state battery, a solid-state accumulator, a lithium-air, lithium-oxygen or lithium-sulfur battery or a lithium-air, lithium-oxygen or lithium-sulfur accumulator, or a supercapacitor.

The energy store is preferably a lithium-air accumulator. In the context of the present invention, the term "lithium-air accumulator" encompasses systems which are based on a reaction with oxygen. Lithium-air and lithium-oxygen systems comprise a negative lithium electrode and a positive gas diffusion electrode (GDE) which is often also referred to as an "air cathode". The electrochemical reaction at the cathode in this case comprises a reaction with oxygen. Said oxygen is typically supplied via the ambient air or can be supplied in the form of oxygen gas. Such systems are generally referred to with the term "lithium-air battery".

Examples and figures which serve to illustrate the present invention are given below.

In the figures:

FIG. 6 shows in FIG. 6*a*) an SEM surface image of layer 2.3 of FIG. 4 and in FIG. 6*b*) an SEM surface image of layer 2.3 of FIG. 5.

Figure 1:
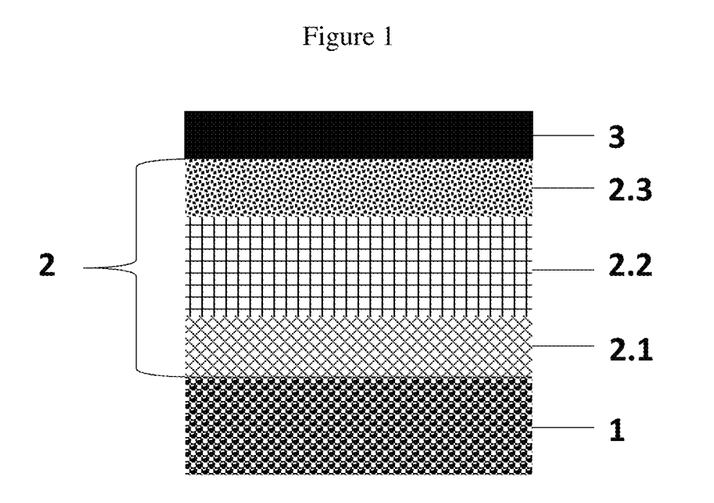
FIG. 1 shows a schematic illustration of a lithium metal battery which contains a three-layer electrolyte arrangement according to one embodiment of the invention as electrolyte.

FIG. 1 shows a schematic view of a lithium metal battery which contains a three-layer electrolyte arrangement 2 according to one embodiment of the invention. The battery has a lithium metal anode 1 as negative electrode and a cathode 3 as positive electrode. The electrolyte arrangement 2 comprising three superposed layers 2.1, 2.2 and 2.3 is arranged between anode 1 and cathode 3. The middle layer 2.2 comprises a porous, electrically nonconducting membrane on both sides of which are arranged layers 2.1 and 2.3 of a polymer-based electrolyte. At least 50% of the pore volume of the porous membrane of layer 2.2 is filled with the polymer-based electrolyte which forms layers 2.1. The polymer-based electrolyte layer 2.3 contains a glass-ceramic material. The polymer used to form the polymer-based electrolyte layers 2.1 and 2.3 can be the same or different. In the illustration of FIG. 1, the glass-ceramic material-containing polymer-based electrolyte layer 2.3 is arranged on the cathode 3.

Figure 2:
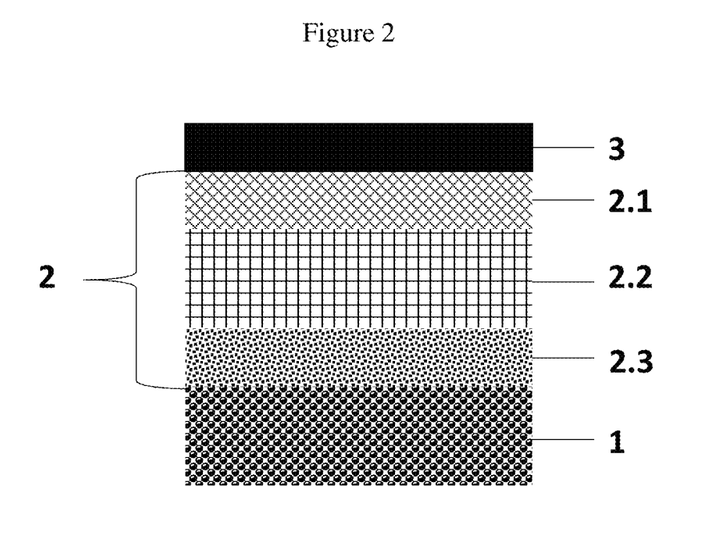
FIG. 2 shows a schematic illustration of a further lithium metal battery which contains a three-layer electrolyte arrangement according to one embodiment of the invention.

FIG. 2 shows a schematic view of a further lithium metal battery having a three-layer electrolyte arrangement 2 arranged between a lithium metal anode 1 and a cathode 3. The layer 2.2 comprises a porous, electrically nonconducting membrane on both sides of which are arranged layers 2.1 and 2.3 of a polymer-based electrolyte. In the illustration of FIG. 2, the glass-ceramic material-containing polymer-based electrolyte layer 2.3 is arranged on the anode 1.

Figure 3:
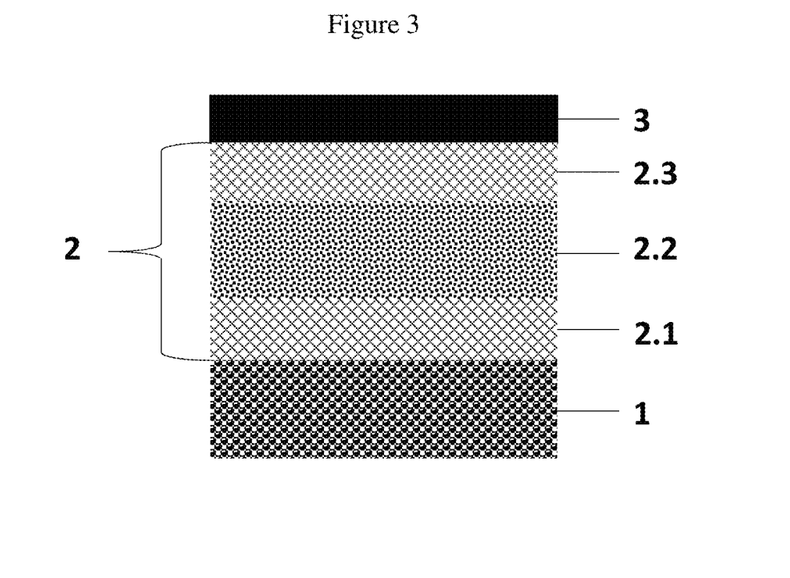
FIG. 3 shows a schematic illustration of a further lithium metal battery which contains a three-layer electrolyte arrangement according to a further embodiment of the invention.

FIG. 3 shows a schematic view of a lithium metal battery having a three-layer electrolyte arrangement 2 according to a further embodiment of the invention arranged between a lithium metal anode 1 and a cathode 3. In the embodiment according to FIG. 3, the middle layer 2.2 contains a ceramic material which does not conduct lithium ions. Such a material of layer 2.2 can be a porous ceramic $Al_2O_3$ membrane, for example a SEPARION® membrane. In this embodiment, the polymer-based electrolyte layers 1.2 and 2.3 do not contain lithium ion-conductive glass-ceramic material.

EXAMPLE 1

1.1 Production of a Three-Layer Electrolyte Arrangement

Electrolyte I: Electrolyte I was produced by dissolving polyethylene oxide (PEO, molecular weight=4 000 000, Dow Chemical), lithium bis(trifluoromethanesulfonyl)imide (LiTFSI, Solvionic, 99.9%), 1-butyl-1-methylpyrrolidinium bis(trifluoromethanesulfonyl)imide ($Pyr_{1,4}$TFSI, Solvionic, 99.9%) and benzophenone (ReagentPlus®, 99%, Merck) in acetonitrile (Merck, 99.8%) at a molar ratio of 10:1:2:0.121. The lithium salt was in this case set to 1. The molecular weight of polyethylene oxide was calculated on the basis of the repeating units. The solution was stirred for 24 hours at 60° C. in order to obtain a viscous dispersion for the coating. The dispersion of electrolyte I was applied with a wet film thickness of 400 μm to one side of a porous polymeric polypropylene membrane (Celgard® 2500, thickness 25 μm, porosity 55%, pore diameter 64 nm according to the manufacturer's information) using a doctor blade (doctor blade coating).

Glass-ceramic-containing electrolyte II: The dispersion of electrolyte I was also used for the non-ceramic part of electrolyte II. A NASICON-type phosphor glass-ceramic ($Li_{1+x}Al_xTi_{2-x}(PO_4)_3$; Schott AG, particle size approx. 0.2 μm) was to this end added to the non-ceramic electrolyte I in a ratio of 64% by weight:36% by weight. The electrolyte dispersion II was applied with a wet film thickness of 100 μm to the other side of the porous polypropylene membrane by means of doctor blade coating.

A comparative arrangement was produced by applying electrolyte dispersion I to both sides of the membrane. The arrangements were each dried under vacuum at a temperature of 60° C. for 24 h. The membranes were then irradiated with UV light for 10 minutes in order to initiate crosslinking of the polymer and to obtain crosslinked three-layer electrolyte arrangements.

1.2 Characterization of the Three-Layer Electrolyte Arrangements 1.2.1 Analysis of the Morphology The SEM images of the membranes were generated using an Auriga® field emission scanning electron microscope (FE-SEM) with CrossBeam® Workstation with a Schottky field emission cathode (Carl Zeiss Microscopy GmbH). The accelerating voltage was 3 kV and an in-lens detector was used. The electrolyte arrangements were each applied to a carbon adhesive pad for the recording of the SEM images.

Figure 4:
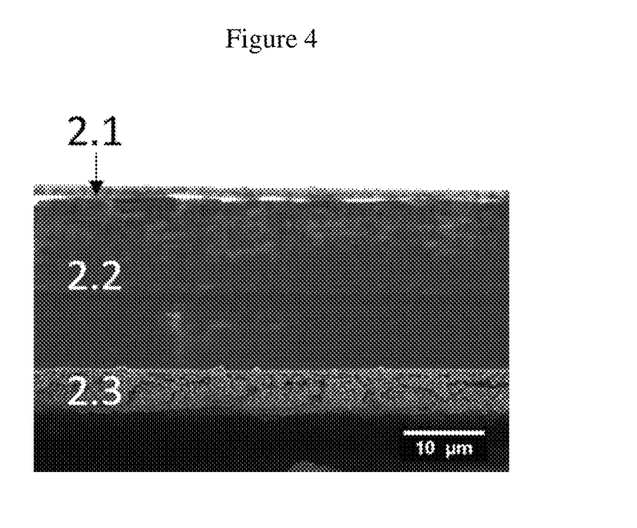
FIG. 4 shows a cross-sectional SEM image of a three-layer electrolyte arrangement according to one embodiment of the invention, containing a glass-ceramic in layer 2.3.

FIG. 4 shows a cross-sectional SEM image of the three-layer electrolyte arrangement containing a glass-ceramic-containing polymer electrolyte layer identified with 2.3. Layer 2.2 comprises the Celgard® membrane and layer 2.1 is formed from the polymer electrolyte I. As can be seen from FIG. 4, the total thickness of the three-layer electrolyte arrangement was 28 μm, with layer 2.1 having a thickness of 2 μm, layer 2.2 having a thickness of 21 μm and layer 2.3 having a thickness of 5 μm. It is assumed that electrolyte dispersion I penetrates into the pores of the porous membrane during the drying process.

Figure 5:
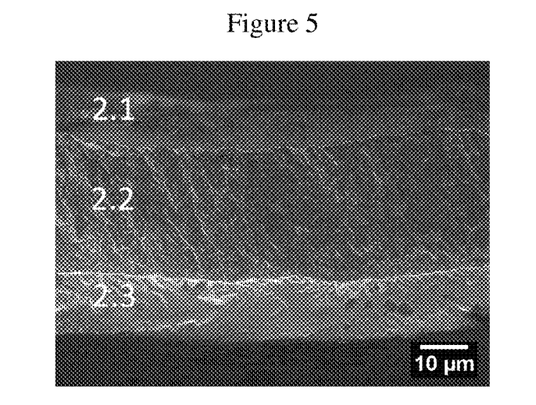
FIG. 5 shows a cross-sectional SEM image of a three-layer comparative arrangement in which the electrolyte in layer 2.3 does not contain glass-ceramic.

FIG. 5 shows a cross-sectional SEM image of the three-layer comparative arrangement. In this case, layer 2.2 also comprises a Celgard® membrane, but both layers 2.1 and 2.3 have been formed from the polymer electrolyte I without glass-ceramic. As can be seen from FIG. 5, the total thickness of the comparative arrangement was 46 µm, with layer 2.1 having a thickness of 7 µm, layer 2.2 having a thickness of 26 µm and layer 2.3 having a thickness of 13 µm. Polymer electrolyte I had also penetrated into the pore volume of the membrane in the comparative arrangement.

Figure 6:
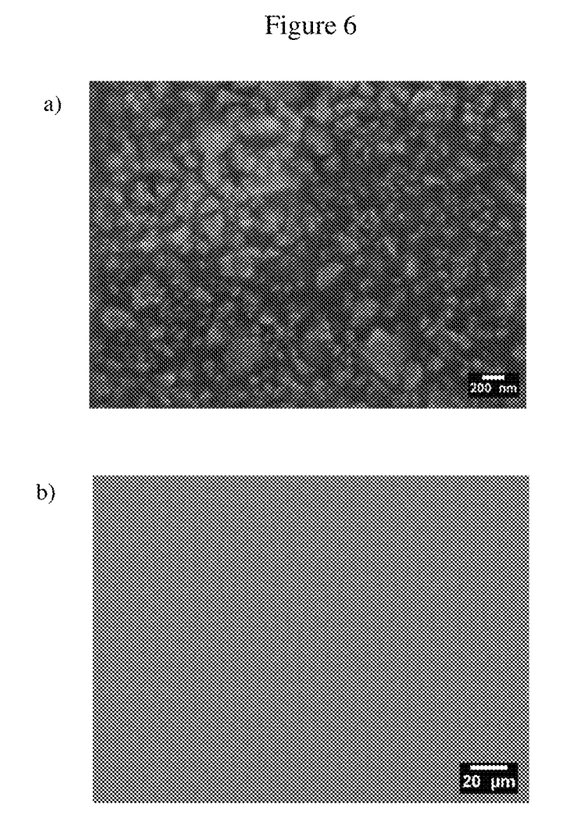

FIG. 6*a*) shows an SEM surface image of the three-layer electrolyte arrangement containing a glass-ceramic in layer 2.3. As can be seen from FIG. 6*a*), the ceramic was distributed homogeneously in the layer. FIG. 6*b*) shows an SEM surface image of the comparative arrangement without glass-ceramic in layer 2.3. This exhibited a smooth polymeric surface.

1.2.2 Determination of the Proportion of the Polymer Electrolyte in the Pores of the Porous Membrane The fill fraction (FF) of the polymer electrolyte in the cavities of the separator was calculated according to the following method. The porosity is defined as the ratio of cavity volume to apparent geometric volume. For the Celgard®2500 PP single-layer separator, the porosity is calculated as follows:

$$\phi(\%) = \left(1 - \frac{W_{separator}/\rho_{PP}}{V_{separator}}\right) \times 100\% \quad [A1]$$

where:
$W_{separator}$ is the weight of the dry separator,
$\rho_{pp}$ is the density of the semicrystalline polypropylene and
$V_{separator}$ is the apparent geometric volume of a 25 µm thick separator.
$\rho_{pp}$ is estimated here according to the indicated degree of crystallization ($X_c$, %) of this separator type ($X_c$=35) to:

$$\rho_{PP} = \frac{100}{X_c/\rho_c + (100 - X_c)/\rho_a} \quad [A2]$$

where the terms $\rho_c$ and $\rho_a$ relate to the density of the crystalline phase (0.936-0.946 g/cm³) and of the amorphous phase (0.850-0.855 g/cm³). The value of $\rho_{pp}$ is accordingly estimated to be ≈0.88 g/cm³.

Accordingly, the fill fraction (FF) of the polymer-based electrolyte in the separator was calculated as:

$$FF = \frac{W_{TSPE}/\rho_{TSPE}}{\phi V_{separator}} \times 100\% \quad [A3]$$

where $W_{TSPE}$ is the weight of the polymer-based electrolyte within the cavities of the separator, and $\rho_{TSPE}$ is the measured density of the polymer-based electrolyte with a value of 1.40 g/cm³.

As a result of the measurement of the average thickness of the polymer-based electrolyte-filled Celgard®2500 separator (~47 µm) and of the average weight of the polymer-based electrolyte-filled Celgard®2500 separator and of the pure Celgard®2500 separator with a diameter of 1.6 cm (11.94 mg and 1.98 mg, respectively), the value of $\phi_{Celgard®2500}$ is 55% and the filling of the pore volume of the porous electrically nonconducting membrane with the polymer-based electrolyte was estimated to be ≈97%.

1.2.3 Determination of the Ionic Conductivity

The ionic conductivity of the three-layer electrolyte arrangements produced in Example 1.1 was determined by measuring the electrochemical impedance using a Novocontrol Technologies impedance measuring appliance with temperature control. The measurement cell consisted of two stainless-steel electrodes with an area of 2 cm². The respective electrolyte arrangement was placed between these. The measurements were performed at temperatures in the range from 0° C. to 80° C.

Figure 7:
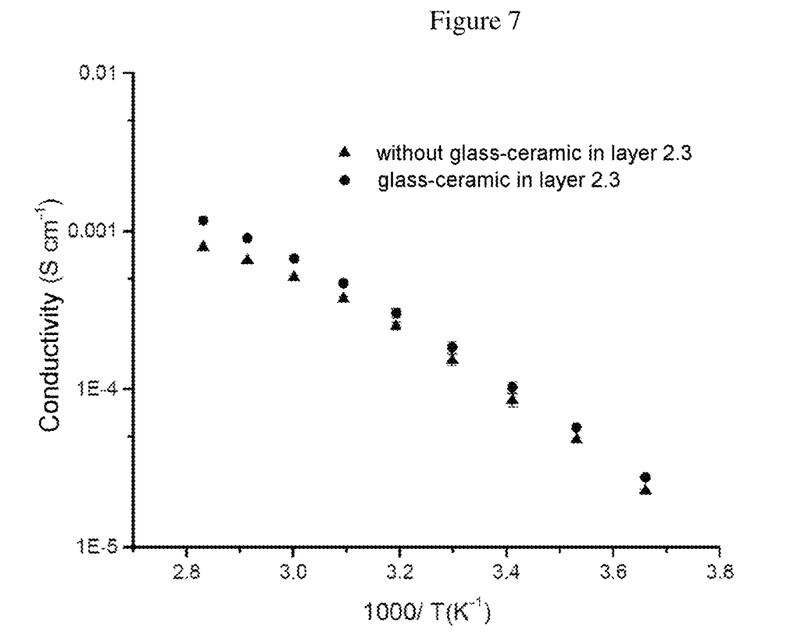
FIG. 7 shows the calculated specific conductivity of the three-layer electrolyte arrangements according to Example 1 and the comparative arrangement at different temperatures.

FIG. 7 respectively shows the calculated specific conductivity of the three-layer electrolyte arrangement with glass-ceramic and of the comparative arrangement without ceramic at different temperatures. As can be gathered from FIG. 7, the impedance measurements showed that the addition of the ceramic into layer 2.3 improved the conductivity at all measured temperatures, for example by 0.67 mS/cm at 60° C.

1.2.4 Determination of the Thermal Shrinkage

The thermal shrinkage test can be used to ascertain the extent to which the membrane shrinks at a fixed temperature at a specific time. To this end, the electrolyte arrangements produced according to Example 1.1 and an uncoated Celgard® membrane were held at 120° C. for 30 minutes under vacuum. 3 experiments were carried out in each case.

The result of the analysis is shown in Table 1. This shrinkage is given as a ratio of the areas before and after the thermal treatment in percent.

TABLE 1

Thermal shrinkage after 30 minutes at 120° C.

| Electrolyte | Shrinkage Fel |
|---|---|
| three-layer electrolyte arrangement with glass-ceramic in layer 2.3 | <1 |
| three-layer electrolyte arrangement without glass-ceramic | 6 ± 1 |
| Celgard ® 2500 membrane | 17 ± 1 |

The result shows that the glass-ceramic in layer 2.3 can prevent shrinkage. This increases the safety of the batteries.

1.2.5 Determination of the Transference Number for Li⁺

The transference number denotes the fraction of the total electrical current which is transported by a given ionic species such as Li⁺. The transference number ($t_{Li+}$) of the three-layer electrolyte arrangements produced in Example 1.1 was determined using a symmetric Li/Li cell (CR2032 button cell) according to the method of Evans, Vincent and Bruce, as described in: Evans, J., Vincent, C. A., & Bruce, P. G. (1987). Electrochemical measurement of transference numbers in polymer electrolytes. Polymer, 28(13), 2324-2328.

The result is shown in Table 2 below. As can be gathered from this table, the addition of a NASICON glass-ceramic to electrolyte II increased the transference number:

TABLE 2

Transference number at 60° C.

| Electrolyte | $t_{Li+}$ |
|---|---|
| three-layer electrolyte arrangement with glass-ceramic in layer 2.3 | 0.22 |

TABLE 2-continued

Transference number at 60° C.

| Electrolyte | $t_{Li+}$ |
|---|---|
| three-layer electrolyte arrangement without glass-ceramic | 0.08 |

1.2.6 Analysis of the Dendrite Penetration

The effect of the Celgard® 2500 membrane on dendrite formation was analysed in a symmetric lithium/lithium cell (CR2032 button cell). Lithium metal foil served as the reference electrode. Galvanostatic polarization was effected at 0.1 mA cm$^{-2}$ at 60° C. Analysis was performed on the three-layer electrolyte arrangement without glass-ceramic produced according to Example 1.1 and a monolayer polymer electrolyte made from electrolyte I having a thickness of 40-60 µm.

Figure 8:
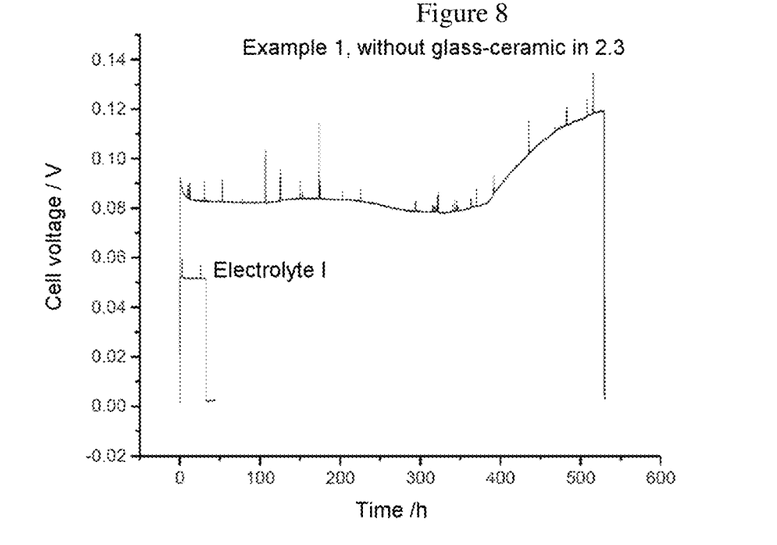
FIG. 8 shows the evolution of the cell voltage over time during the galvanostatic polarization of a cell using the three-layer electrolyte arrangement according to Example 1 and the comparative arrangement.

FIG. 8 shows the evolution of the cell voltage over time during the galvanostatic polarization. The cell voltage is given vs. Li/Li$^+$. As can be gathered from FIG. 8, the electrolyte I in the symmetric Li—Li cell exhibited a drop in the cell voltage at a current strength of 3 mAh/cm$^2$. The drop in the cell voltage indicates a short circuit which is caused by the lithium dendrites formed puncturing through the electrolyte. The electrolyte which comprises a Celgard® membrane in the middle layer (2.2) was able to survive at currents up to 50 mAh/cm$^2$ without a short-circuit occurring as a result of penetrating dendrites. This shows that the porous, electrically nonconducting membrane in the middle layer can prevent penetration of the electrolyte by dendrites.

1.2.7 Analysis of the Three-Layer Electrolyte Arrangement in an Li Metal Full Cell The three-layer electrolyte arrangements with glass-ceramic produced according to Example 1.1 and the comparative arrangement without ceramic were electrochemically analysed in lithium metal full cells of button cell design against different cathodes. A monolayer polymer electrolyte having a thickness of 40-60 µm made from electrolyte I was analysed as a further reference.

Lithium iron phosphate (LFP) and lithium nickel manganese cobalt mixed oxide (NMC811) cathodes were produced by mixing a slurry of LFP or NMC811, electrolyte I and carbon black in a weight ratio of 8:1:1 (w/w/w) and applying this with a wet film thickness of 150 µm to an aluminium foil by means of a doctor blade. The electrodes were dried at 110° C. for 24 hours under vacuum prior to use. Round electrodes were stamped out with a diameter of 12 mm and a surface loading of approximately 2 mg cm$^{-2}$ for LFP and 5 mg cm$^{-2}$ for NMC811.

The button cells were constructed as follows: the positive electrode was either the LFP or NMC811 electrode and the negative electrode was Li metal. In the cell structure the glass-ceramic-containing layer 2.3 contacted the positive electrode. Constant current cycling at 60° C. and with a rate of 0.1 C was performed with LFP as cathode in the potential range from 4.2 V to 2.0 V and with NMC811 in a range from 4.3 V to 2.0 V.

Figure 9:
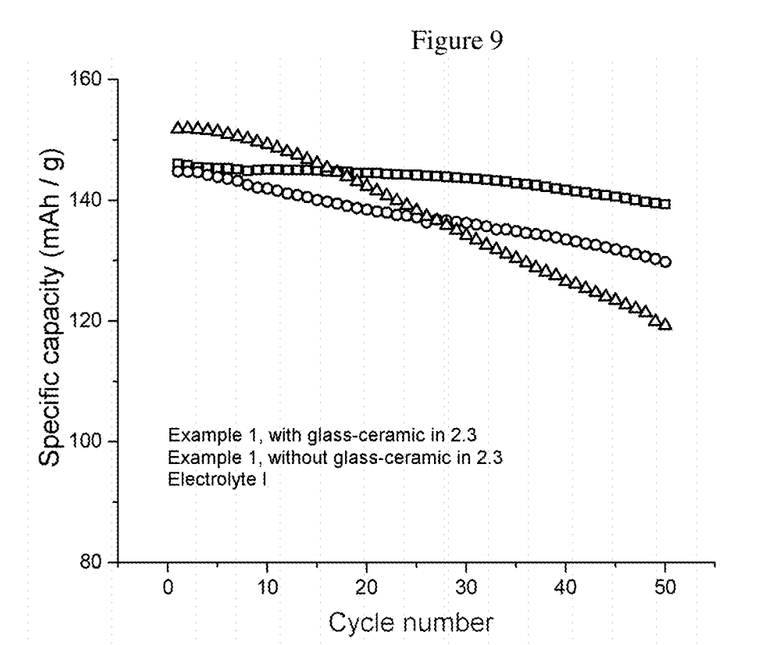
FIG. 9 shows the cycling behaviour of an Li metal cell with LFP as cathode in the potential range from 4.2 V-2.0 V and with a rate of 0.1C using the three-layer electrolyte arrangements according to Example 1 and the comparative arrangement.

FIG. 9 shows the results of the cycling measurements with LFP as cathode over 50 cycles.

As can be gathered from FIG. 9, cycling stability was increased by the glass-ceramic in layer 2.3.

Figure 10:
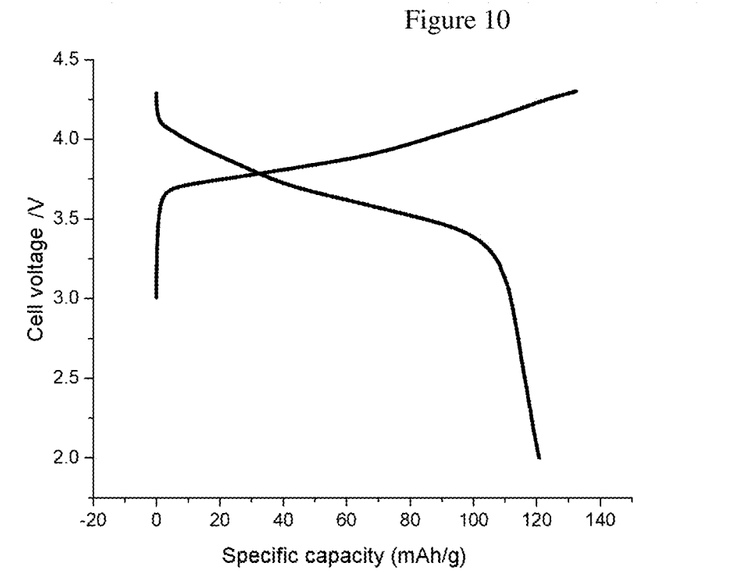
FIG. 10 shows the voltage profile of an Li metal cell with NMC811 as cathode with a voltage range from 4.3 V-2.0 V and a rate of 0.1 C using the three-layer electrolyte arrangements according to Example 1 and the comparative arrangement.

FIG. 10 shows the voltage profile of the Li metal cell with NMC811 as cathode for the three-layer electrolyte arrangement with glass-ceramic. As can be gathered from FIG. 10, NMC811 can also be used as a positive electrode for this electrolyte arrangement.

EXAMPLE 2

2.1 Production of a Three-Layer Electrolyte Arrangement

Electrolyte I: Electrolyte I was produced by dissolving polyethylene oxide (PEO, molecular weight=4 000 000), lithium bis(trifluoromethanesulfonyl)imide (LiTFSI), 1-butyl-1-methylpyrrolidinium bis(trifluoromethanesulfonyl)imide (Pyr$_{1,4}$TFSI) and benzophenone in acetonitrile at a molar ratio of 10:1:2:0.121. The lithium salt was in this case set to 1. The molecular weight of polyethylene oxide was calculated on the basis of the repeating units. The solution was stirred for 24 hours at 60° C. in order to obtain a viscous dispersion for the coating. The dispersion of electrolyte I was applied with a wet film thickness of 400 µm to one side of a porous polymeric polypropylene membrane (Celgard® 2500) using a doctor blade.

Glass-ceramic-containing electrolyte II: the non-ceramic part was produced by mixing polyvinylidene fluoride (PVDF), LiTFSI and Pyr$_{1,4}$TFSI at a molar ratio of 7.2:1:2 in acetone and the solution was stirred at 50° C. LLZO (garnet type, Schott AG, particle size approx. 1 µm) was then added as ion-conducting ceramic to the non-ceramic part of the electrolyte in a ratio of 65% by weight to 35% by weight. A homogeneous dispersion was obtained after 2 hours of stirring at 50° C. This electrolyte dispersion II was applied with a wet film thickness of 250 µm to the other side of the polypropylene membrane.

The coated membrane was dried under vacuum at a temperature of 60° C. for 24 h. During this drying process, electrolyte dispersion I diffused into the porous polypropylene membrane and occupied approx. 80-100% of the pore volume. The membrane was then irradiated with UV light for 10 minutes in order to initiate crosslinking of the polymer and to obtain crosslinked three-layer electrolyte arrangements.

2.2 Electrochemical Characterization in an LNMO Full Cell

The three-layer electrolyte arrangement with glass-ceramic produced according to Example 2.1 was electrochemically analysed in lithium metal full cells of button cell design against a high-voltage lithium nickel manganese oxide (LNMO) cathode.

The positive electrode was produced by mixing the active material LNMO, the conductivity additive carbon black and PVDF as binder at a weight ratio of 8:1:1. After coating onto aluminium foil and drying, the electrode was completely wetted with a mixture of LiTFSI in Pyr$_{1,4}$TFSI at a ratio of 1:2 and subsequently dried for 24 hours under vacuum at a temperature of 60° C. In the cell structure of the button cell, the glass-ceramic-containing layer was arranged on the positive electrode. The negative electrode was lithium metal. Constant current cycling at 60° C. and with a C rate of 0.1 C was performed in the potential range from 4.85 V to 3.5 V.

Figure 11:
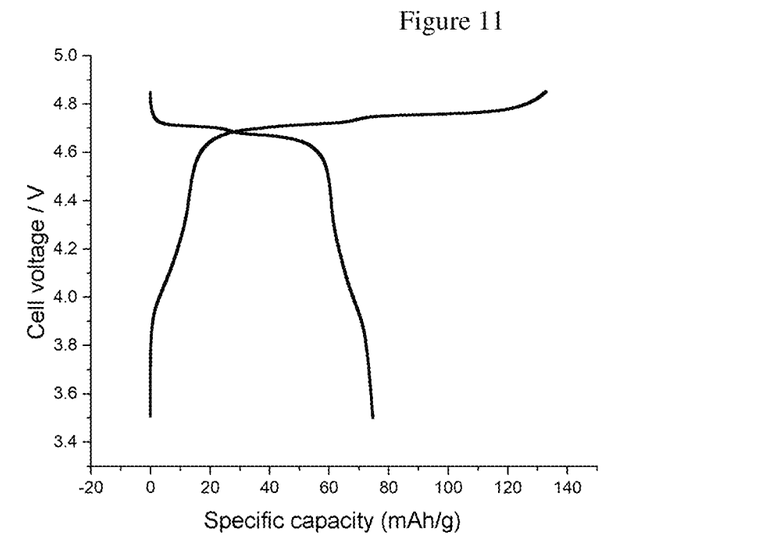
FIG. 11 shows the voltage profile of an LNMO lithium metal cell at 60° C. using the three-layer electrolyte arrangement according to Example 2.

FIG. 11 shows the voltage profile of the Li metal cell with LNMO cathode and the three-layer electrolyte arrangement with glass-ceramic. As can be gathered from FIG. 11, the voltage profile showed that the cell could be cycled. Thus, a rechargeable solid-state electrolyte cell with a 5 V cathode could be provided.

EXAMPLE 3

3.1 Production of a Three-Layer Electrolyte Arrangement

Electrolyte I: Electrolyte I was produced by dissolving polyethylene oxide (PEO, molecular weight=4 000 000), lithium bis(trifluoromethanesulfonyl)imide (LiTFSI), 1-butyl-1-methylpyrrolidinium bis(trifluoromethanesulfonyl)imide ($Pyr_{1,4}TFSI$) and benzophenone in acetonitrile at a molar ratio of 10:1:2:0.121. The solution was stirred for 24 hours at 60° C. in order to obtain a dispersion for the coating. The dispersion of electrolyte I was applied with a wet film thickness of 400 µm to one side of a porous polymeric polypropylene membrane (Celgard® 2500) using a doctor blade.

Glass-ceramic-containing electrolyte II: The dispersion of electrolyte I was also used for the non-ceramic part of electrolyte II. For this purpose, a lithium ion-conducting ceramic LLZO (garnet type, Schott AG, particle size approx. 1 µm) was added to the non-ceramic electrolyte I in a ratio of 64% by weight:36% by weight. The electrolyte dispersion II was applied with a wet film thickness of 250 µm to the other side of the porous polypropylene membrane by means of doctor blade coating.

The coated membrane was dried under vacuum at a temperature of 60° C. for 24 hours. During this drying process, electrolyte dispersion I diffused into the porous polypropylene membrane and occupied approx. 80-100% of the pore volume. The membrane was then crosslinked under UV light for 10 minutes.

3.2 Analysis of the Dendrite Penetration

The dendrite formation when using the three-layer electrolyte arrangement produced according to Example 3.1 was analysed in a symmetric lithium/lithium cell (CR2032 button cell). Lithium metal foil served as the reference electrode. Galvanostatic polarization was effected at 0.1 mA $cm^{-2}$ at 60° C.

Figure 12:
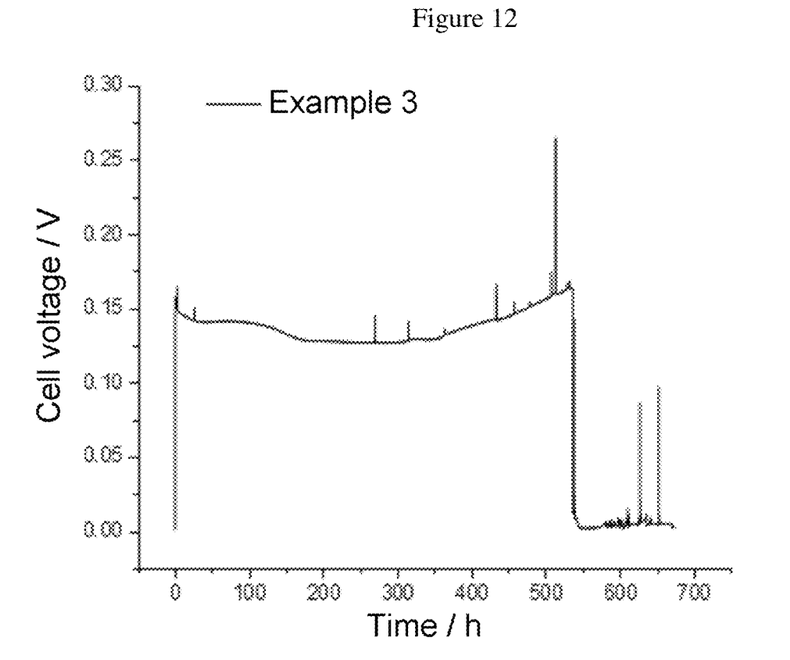
FIG. 12 shows the evolution of the cell voltage over time during galvanostatic polarization using the three-layer electrolyte arrangement according to Example 3.

FIG. 12 shows the evolution of the cell voltage over time during the galvanostatic polarization. The cell voltage is given vs. $Li/Li^+$. As can be gathered from FIG. 12, the three-layer electrolyte arrangement with LLZO ceramic could survive at currents of up to 50 $mAh/cm^2$. This shows that this electrolyte arrangement is usable under the practical demands placed on current electrolytes.

Evolution of the cell voltage over time during galvanostatic polarization using the three-layer electrolyte arrangement according to Example 3.

3.3 Analysis of the Three-Layer Electrolyte Arrangement in an LFP Full Cell

The three-layer electrolyte arrangement with LLZO ceramic produced according to Example 3.1 was analysed in full cells with a negative electrode made from lithium metal and a positive electrode made from lithium iron phosphate (LFP).

The LFP cathodes were produced by mixing a slurry of LFP, electrolyte I and carbon black in a weight ratio of 8:1:1 (w/w/w) and coating this with a wet film thickness of 150 µm onto an aluminium foil by means of a doctor blade. The electrode was dried at 110° C. for 24 hours under vacuum. Round electrodes were stamped out with a diameter of 12 mm and a surface loading of approximately 2 mg $cm^{-2}$. The cell was installed in a button cell, the LLZO ceramic-containing electrolyte layer facing towards the negative electrode. Constant current measurement was performed in the potential range from 4.2-2.0 V and at a C rate of 0.1 and at 60° C.

Figure 13:
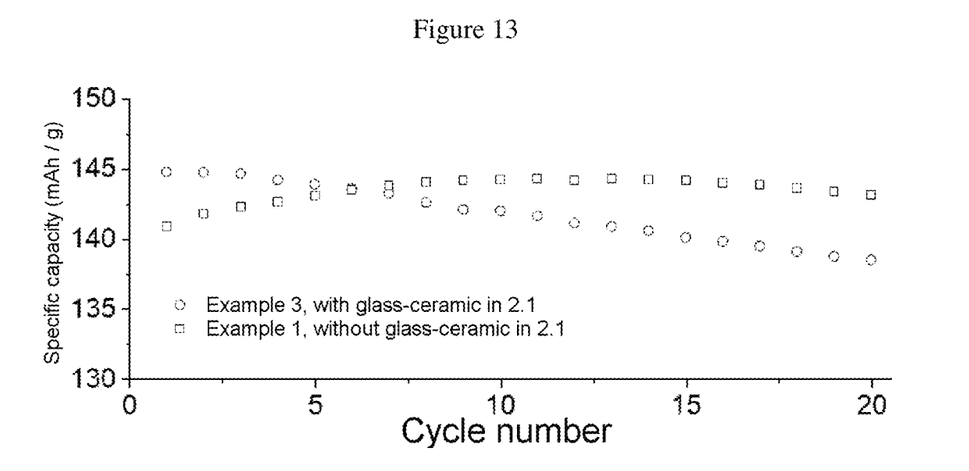
FIG. 13 shows the cycling behaviour of an Li metal cell with LFP as cathode in the potential range from 4.2 V-2.0 V and with a rate of 0.1C using the three-layer electrolyte arrangements according to Example 3 and a comparative arrangement.

FIG. 13 shows the voltage profile of the LFP-lithium metal cell at 60° C. As can be gathered from FIG. 13, the LLZO glass-ceramic-containing electrolyte could prevent a loss of capacity and increase cycling stability. It is assumed that this is due to the fact that fewer lithium dendrites were formed.

3.4 Electrochemical Characterization in an Li/Air Cell

The electrolyte arrangement was also analysed in a lithium/air cell with an air cathode (ECC-Air cell, EL-CELL GmbH). The cathode used was a commercial $Co_3O_4/C$ coated on a nickel mesh with PTFE as binder (gas diffusion cathode (GDE), MEET Co., Ltd.). The catholyte used was 2 M LiTFSI in DMSO. Constant current cycling (CCC) was performed at a current strength of 0.2 $mA/cm^2$ and a cut-off current strength of 3 $mAh/cm^2$ under constant oxygen stream at room temperature (20° C.±2° C.).

Figure 14:
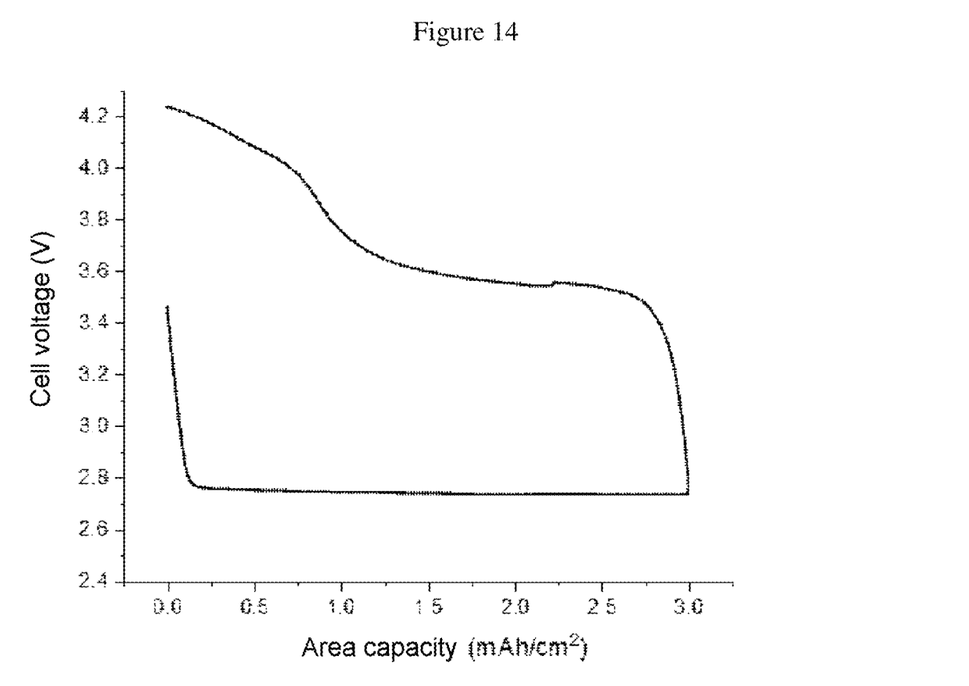
FIG. 14 shows the voltage profile of an Li-$O_2$ battery at room temperature using a three-layer electrolyte arrangement according to Example 3.

FIG. 14 shows the voltage profile of the lithium/air cell at room temperature. As can be gathered from FIG. 14, the cell displayed a rechargeable behaviour. The result shows that the three-layer electrolyte arrangement, where the LLZO ceramic-containing electrolyte layer faces towards the negative electrode, provides an ion-conducting path. At the same time, the electrolyte can function as a protective layer for the side reactions between the lithium metal and DMSO and also oxygen in the diffusion cell.

EXAMPLE 4

Production and Electrochemical Characterization of a Three-Layer Electrolyte Arrangement in a Lithium-Sulfur Full Cell To produce a middle layer 2.2, electrolyte I was first produced by dissolving polyethylene oxide (PEO, molecular weight=4 000 000), lithium bis(trifluoromethanesulfonyl)imide (LiTFSI), 1-butyl-1-methylpyrrolidinium bis(trifluoromethanesulfonyl)imide ($Pyr_{1,4}TFSI$) and benzophenone in acetonitrile at a molar ratio of 10:1:2:0.121. The solution was stirred for 24 hours at 60° C. in order to obtain a dispersion for the coating. The dispersion of electrolyte I was applied with a wet film thickness of 300 µm to one side of a porous polymeric polypropylene membrane (Celgard® 2500) using a doctor blade.

The dispersion of electrolyte I was also used for the non-ceramic part of electrolyte II. For the electrolyte II, a lithium ion-conducting ceramic LLZO (garnet type, Schott AG, particle size approx. 1 µm) was added to the non-ceramic electrolyte I in a ratio of 65% by weight:35% by weight. To produce the polymer-based electrolyte layer 2.1, the electrolyte dispersion II was applied with a wet film thickness of 250 µm to the other side of the porous polypropylene membrane by means of doctor blade coating. The coated membrane was dried under vacuum at a temperature of 60° C. for 24 hours. During this drying process, electrolyte dispersion I diffused into the porous polypropylene membrane and occupied approx. 80-100% of the pore volume. The polymer was then crosslinked under UV light for 10 minutes.

A second lithium aluminium germanium phosphate ceramic (LAGP)-containing polymer-based electrolyte layer 2.2 was formed on the cathode. For this purpose, first a cathode was produced by mixing a slurry of sulfur active material (Merck), conductivity additive TIMCAL C-NERGY™ SUPER C65 Carbon Black and PEO (molecular weight=4 000 000) in a weight ratio of 60:23:17 (w/w/w) and coating this with a wet film thickness of 200 µm onto aluminium foil by means of a doctor blade. The electrode was dried at 40° C. for 12 hours under vacuum. An LAGP ceramic (Toshima Manufacturing Co., Ltd., $Li_{1.5}Al_{0.5}Ge_{1.5}P_3O_{12}$, median particle size $d_{50}$=1 µm) was added to the non-ceramic electrolyte I in a weight ratio of 70% by weight:30% by weight. This dispersion was then applied with a film thickness of 10 μm to the cathode, dried and crosslinked under UV light. A round electrode was stamped out with a diameter of 12 mm and a surface loading of approximately 2 mg cm$^{-2}$.

The arrangement of LLZO-containing polymer-based electrolyte layer on the polypropylene membrane was arranged on the LAGP-containing polymer-based electrolyte layer of the coated cathode, the LLZO-containing electrolyte layer facing towards the negative electrode.

The three-layer electrolyte arrangement with cathode was installed in a button cell with a negative electrode made from lithium metal and analysed. As reference, a corresponding full cell without LAGP-containing layer was analysed. The constant current measurement was performed in the potential range from 3.0-1.5 V and at a C rate of 0.1 and a temperature of 60° C.

Figure 15:
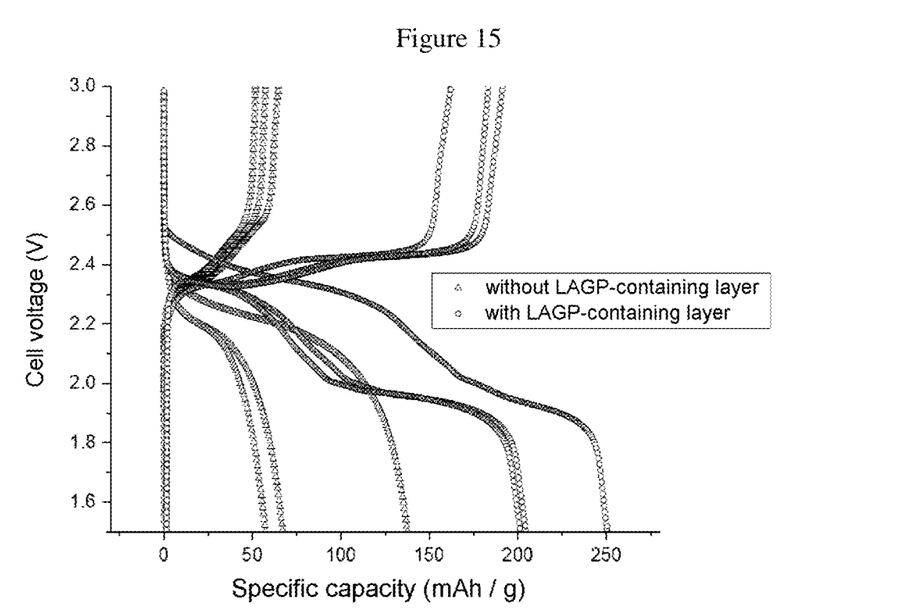
FIG. 15 shows the voltage profile of a lithium metal-sulfur cell at 60° C. according to
Example 4 and of a comparative arrangement.

FIG. 15 shows the voltage profile of the lithium metal-sulfur cells using the electrolyte arrangement ("without LAGP-containing layer") and the three-layer electrolyte arrangement ("with LAGP-containing layer") at 60° C. As can be gathered from FIG. 15, the full cell with LAGP-containing layer exhibited a higher capacity. It is assumed that this can be attributed to the LAGP-containing layer preventing a "polysulfide shuttle effect".

EXAMPLE 5

Three-Layer Electrolyte Arrangement with Ceramic-Containing Layer 2.2
5.1 Production of a Three-Layer Arrangement with Ceramic-Containing Layer 2.2

The electrolyte was produced by dissolving polypropylene carbonate (PCC, molecular weight 50 000), LiTFSI, Pyr$_{1,4}$TFSI and benzophenone at a molar ratio of 5:1:2:0.12. The solution was stirred at 60° C. for 24 h. The electrolyte was applied with a wet film thickness of 400 μm to a porous ceramic Al$_2$O$_3$ membrane (SEPARION®) using a doctor blade. This electrolyte was also applied with a wet film thickness of 250 μm to the other side of the porous ceramic membrane using the doctor blade method. The coated membrane was dried under vacuum at a temperature of 60° C. for 24 hours. As a result of this process, electrolyte I penetrated into the pores of the membrane and occupied approximately 80-100% of the pore volume. The membrane was then crosslinked by irradiation with UV light for 10 minutes.

The positive electrode was produced by mixing the active material LFP, the conductivity additive carbon black and PVDF as binder at a weight ratio of 90:5:5. After coating onto aluminium foil, the electrode was completely wetted with the electrolyte and then dried under vacuum for 24 hours.
5.2 Electrochemical Characterization in the LFP Full Cell The cell was constructed as a button cell using the LFP electrode as positive electrode and a lithium metal anode. The constant current measurements were performed in the range from 3.8-2.5 V at a C rate of 0.1 and a temperature of 20° C. and of 60° C.

Figure 16:
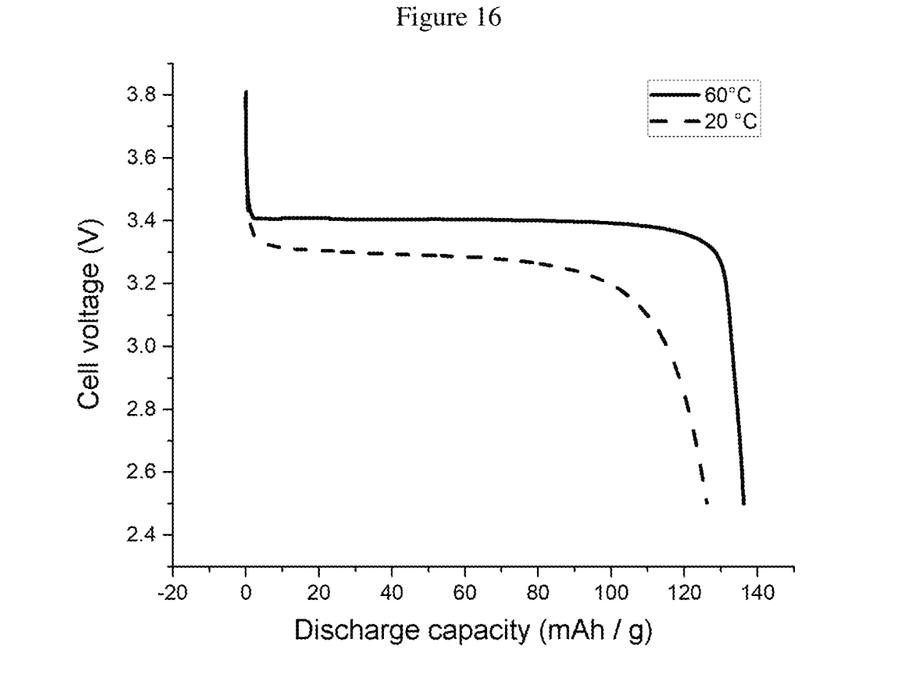
FIG. 16 shows the voltage profile of an LFP lithium metal cell at 20° C. and at 60° C. using a three-layer electrolyte arrangement according to Comparative Example 5.

FIG. 16 shows the voltage profile of the LFP-lithium metal cells at 20° C. and 60° C. As can be gathered from FIG. 16, the polymer-based electrolyte layer without glass-ceramic material was compatible with an LFP cathode with a discharge plateau at 3.3 V at 20° C. and at 3.4 V at 60° C.

This shows that a three-layer electrolyte arrangement, in which the middle layer contains a ceramic material which does not conduct lithium ions and is arranged between two layers of polymer-based electrolyte without glass-ceramic material, also displays good functionality.

The invention forming the basis for this patent application originated in a project funded by the BMBF (German Federal Ministry of Education and Research) under the funding code

The invention claimed is:

1. An electrolyte arrangement for a cell having at least one anode (1) and at least one cathode (3) comprising at least three superposed layers (2.1, 2.2, 2.3), said at least three superposed layers having:
a middle layer (2.2) comprised of a porous electrically nonconductive structure, and
a layer of a polymer-based electrolyte (2.1, 2.3) arranged on both opposite sides of the porous electrically nonconductive structure,
wherein only one of the polymer-based electrolyte layers (2.1, 2.3) contains a lithium ion-conductive ceramic material, and
wherein the middle layer (2.2) is ceramic-free, and
wherein the polymer-based electrolyte layers comprise a polymer selected from the group consisting of polyethylene oxide, polypropylene carbonate, polyethylene carbonate, poly (bis((methoxyethoxy) ethoxy) phosphazene), polypropylene oxide, polysiloxane having an average molecular weight of from 300 g/mol to 10,000 g/mol and mixtures and copolymers thereof and an organic or inorganic salt of lithium.

2. The electrolyte arrangement according to claim 1, characterized in that in the range from ≥50% by volume to ≤100% by volume of a pore volume of the porous electrically nonconductive structure is filled with a polymer-based electrolyte.

3. The electrolyte arrangement according to claim 1, characterized in that the total thickness of the electrolyte arrangement (2) is in the range from ≥5 μm to ≤300 μm.

4. The electrolyte arrangement according to claim 1, characterized in that the polymer-based electrolyte layers comprise polyethylene oxide.

5. The electrolyte arrangement according to claim 1, characterized in that the polymer-based electrolytes layers further include a plasticizer and/or crosslinker.

6. The electrolyte arrangement according to claim 1, characterized in that the polymer-based electrolytes layers further include a plasticizer and/or crosslinker, wherein the molar ratio of polymer to lithium salt to plasticizer and to crosslinker is in the range from ≥0.5 to ≤20:1:>0 to ≤10: ≥0 to ≤1.

7. The electrolyte arrangement according to claim 1, characterized in that the proportion of ceramic material in a polymer-based electrolyte layer is in the range from >5% by weight to ≤80% by weight, based on a total weight of the polymer-based electrolyte layer of 100% by weight.

8. An electrolyte electrode composite, comprising an anode (1), a cathode (3) and an electrolyte arrangement (2) according to claim 1 arranged between the anode and cathode.

9. A primary or secondary energy store, comprising an electrolyte arrangement (2) according to claim 1.

10. The electrolyte arrangement according to claim 2, characterized in that in the range from >70% by volume to ≤100% by volume, of the pore volume of the porous electrically nonconductive structure is filled with a polymer-based electrolyte.

11. The electrolyte arrangement according to claim 2, characterized in that in the range from >80% by volume to ≤100% by volume, of the pore volume of the porous electrically nonconductive structure is filled with a polymer-based electrolyte.

12. The electrolyte arrangement according to claim 3, characterized in that the total thickness of the electrolyte arrangement (2) is in the range from ≥ 10 μm to ≤200 μm.

13. The electrolyte arrangement according to claim 3, characterized in that the total thickness of the electrolyte arrangement (2) is in the range from ≥ 15 μm to ≤100 μm.

14. The electrolyte arrangement according to claim 7, characterized in that the proportion of ceramic material in a polymer-based electrolyte layer is in the range from ≥35% by weight to ≤65% by weight, based on a total weight of the polymer-based electrolyte layer of 100% by weight.

15. The primary or secondary energy store according to claim 9, wherein the primary or secondary energy store is a lithium metal battery, solid-state battery, solid-state accumulator, lithium-air, lithium-oxygen or lithium-sulfur battery or accumulator or supercapacitor.

\* \* \* \* \*